Aug. 19, 1924.

A. E. BRONSON

NUT 1,505,580

Filed Oct. 23, 1922

Inventor
Adelbert E. Bronson
by
Thurston Kwis & Hudson
attys

Patented Aug. 19, 1924.

1,505,580

UNITED STATES PATENT OFFICE.

ADELBERT E. BRONSON, OF CLEVELAND, OHIO.

NUT.

Application filed October 23, 1922. Serial No. 596,248.

*To all whom it may concern:*

Be it known that I, ADELBERT E. BRONSON, a citizen of the United States, residing at Cleveland, in the county of Cuyahoga and State of Ohio, have invented a certain new and useful Improvement in Nuts, of which the following is a full, clear, and exact description.

This invention relates to a nut which is particularly adapted for use in connection with valve stems of pneumatic tires, the nut being adapted to be threaded upon the valve stem and bearing against the felloe of the wheel upon which the tire is mounted for securing the valve stem in proper relation to the felloe of the wheel.

Nuts for this purpose have heretofore been used, and the present invention is directed toward the construction of such a nut, and primarily wherein the parts are formed by drawing the same from metal, and suitably securing the parts forming the nut to each other.

Another object of the invention is to provide a nut of the character described in which the construction is rigid and amply strong for the use for which it is intended, at the same time made in such a manner as to make it possible to manufacture the same at a low cost of production.

Figure 2:
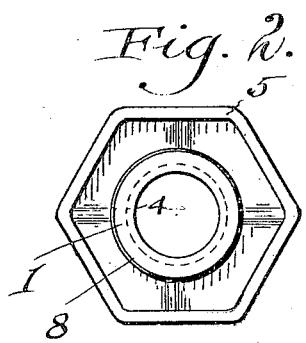
Figure 1:
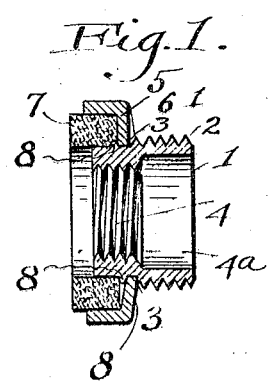
Figure 3:
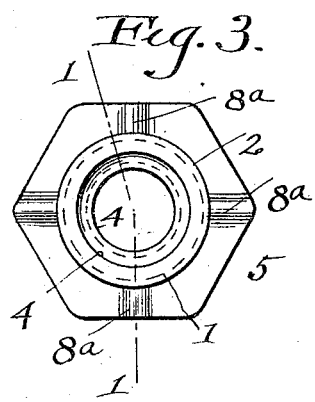
Figure 5:
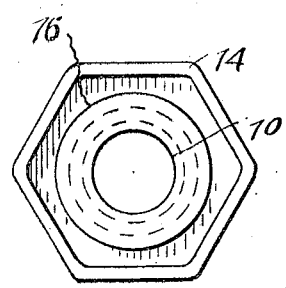
Figure 4:
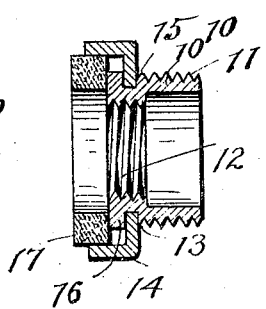
Figure 6:
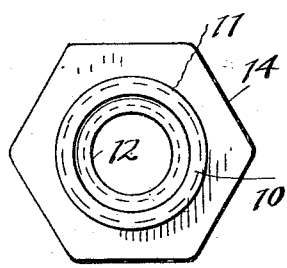

Reference should be had to the accompany drawings forming a part of this specification, in which Fig. 1 is a sectional elevation; Fig. 2 is an end elevation; Fig. 3 is an opposite end elevation; Fig. 4 is a sectional elevation of a modified form; Fig. 5 is an end elevation of the showing in Fig. 4, and Fig. 6 is an opposite end elevation of the showing in Fig. 4.

Referring to the drawings, 1 indicates a hollow cylindrical member or part upon which the outer surface at one end is provided with screw threads 2, these threads extending over approximately one half of the outside area of the cylindrical member 1. At the base of the threads there is preferably formed an annular shoulder 3, this shoulder as indicated extending all the way around the cylindrical member 1. That portion of the cylindrical member 1 which is below the shoulder 3 is, when the cylindrical part is formed, of uniform diameter and free from obstructions.

Upon the interior the cylindrical member is provided with threads 4 which extend throughout a portion of the inner surface of the member 1, and if desired the outer end of the inner cylindrical surface may be of enlarged diameter as indicated at 4$^a$.

This cylindrical member 1 may be formed in any desired manner, as from tubing, and the finishing operations upon the inside surface, as well as the outside surface of this member may be performed in any suitable manner, as by means of screw machines.

There is a cup-shaped member 5 which may be conveniently formed as a stamping from sheet metal. This member 5 has a central opening 6 which is of a diameter to snugly fit upon the unthreaded outer surface portion of the member 1. The flange of this cup-shaped portion extends parallel with the cylindrical member 1, and slightly below the same, and is adapted to receive an annular ring of packing material 7.

The cup-shaped member 5 and the cylindrical member 1 are secured together by placing the cup-shaped member 5 upon the cylindrical member 1 until the cup-shaped member 5 engages with a shoulder 3, then a portion of the metal forming the outer surface below the cup-shaped member 5 is pushed up, as by a spinning operation, and it is crowded against the inner adjacent portion of the cup-shaped member 5 which serves to securely grip and pinch the cup-shaped member 5 and hold it upon the member 1.

In order to more securely fasten the cup-shaped member in position and prevent relative rotation between the cylindrical member 1 and the cup-shaped member 5, the upper flat surface of the cup-shaped member 5 is provided with one or more indentations upon the under surface which manifest themselves as projections upon the outer surface, as indicated at 8$^a$ in Fig. 3, wherein four of such projections are shown.

When the metal is spun against the under side of the cup-shaped member 5, as indicated at 8, this ridge of metal will also be spun up into the indentation upon the inside of the cup-shaped member 5, and will thereby provide what may be termed a locking means between the cylindrical member 1 and the cup-shaped member 5 which will not only assist in more thoroughly retaining the cup-shaped member but in preventing its rotation.

The interior threads 4 are intended to cooperate with the threads upon the outside of the usual valve stems, while the threads upon the outside of the cylindrical body 1 may be engaged by threads in a dust cap serving to hold the dust cap, protecting the valve stem, and because of the small number of threads, comparatively speaking, at the portion 2, the dust cap may be rapidly assembled and disassembled from the rim nut.

The cup-shaped member 5 is preferably formed to be polygonal, in the present instance consisting of six sides, the purpose of this being to provide a ready means by which the rim nut may be turned upon the valve stem and brought into close engagement with the rim through which the valve stem projects.

Referring to Fig. 4 there is a modified form shown in which there is a cylindrical member 10 having a portion of its outside surface, adjacent one end, provided with threads, as indicated at 11, and also having a portion of its inner surface at the end opposite to that which has just been mentioned, provided with threads, as indicated at 12. Upon the outside surface and adjacent the base of threads 11 there is a shoulder 13 provided and in its initial condition the diameter of the outside surface of the member 10 below the shoulder 13 was uniform. There is a cup-shaped member 14 which is provided with a central opening 15 which is of a diameter to fit the outside surface of the member 10 below the shoulder 13. In order to secure the cup-shaped member in position a portion of the metal forming the end of the cylindrical member 10 and outside of the screw threads 12 is bent upwardly against the inside of the cup-shaped member 14, as indicated at 16. This will securely pinch and hold the cup-shaped member and prevent relative movement with respect to the cylindrical member 10. The outer flanged portion of the cup-shaped member 14 may receive a packing member 17 which is retained by the cup-shaped member 14, and bears against the inner side of the cylindrical member 10. This member when formed has exactly the same function with respect to the valve stem as that previously described.

The cup-shaped member 14 is preferably formed to be polygonal, in the present instance consisting of six sides, the purpose of this being to provide a ready means by which the rim nut may be turned upon the valve stem and brought into close engagement with the rim through which the valve stem projects.

Having described my invention, I claim:—

1. A rim nut comprising a hollow cylindrical member having a portion of the outside surface provided with screw threads and having screw threads upon the inner surface, a cup-shaped member having a central opening through which a portion of the cylindrical member extends, and means for securing the cup-shaped member to the cylindrical member.

2. A rim nut comprising a hollow cylindrical member having a portion of the outside surface provided with screw threads and having screw threads upon the inner surface, a cup-shaped member having a central opening through which a portion of the cylindrical member extends, and means for securing the cup-shaped member to the cylindrical member, and a packing member inserted within the cup-shaped member and retained thereby.

3. A rim nut comprising a hollow cylindrical member having a portion of its outside surface provided with screw threads and having screw threads upon the interior surface said outside surface being provided with a shoulder, a cup-shaped member having a central opening through which a portion of a cylindrical part extends, the said cup-shaped member contacting with the said shoulder, and means for holding the cup-shaped member against the said shoulder.

4. A rim nut comprising a hollow cylindrical member having a portion of its outside surface provided with screw threads, and having screw threads upon the interior surface said outside surface being provided with a shoulder, a cup-shaped member having a central opening through which a portion of the cylindrical member extends, the said cup-shaped member contacting with the shoulder, a portion of the metal of the cylindrical member being displaced and pushed against the cup-shaped member thereby to hold it against the shoulder.

5. A rim nut comprising a cylindrical member having screw threads upon a portion of its outer surface and a shoulder upon said outer surface at the ends of the screw threads there being screw threads formed upon the inner surface, a cup-shaped member having a central opening through which a portion of the cylindrical member extends, with the cup-shaped member engaging with the said shoulder said cup-shaped member being formed within depressions at the portions adjacent the openings therein and portions of the metal of the cylindrical member being displaced and crowded against the cup-shaped member and into said depressions thereby to secure the said members together and prevent relative rotation.

6. A rim nut comprising a cylindrical member having screw threads upon a portion of its outer surface and a shoulder upon said outer surface at the ends of the screw threads there being screw threads formed upon the inner surface, a cup-shaped member having a central opening through which a portion of the cylindrical member extends, with the cup-shaped member engaging with the said shoulder said cup-shaped member being formed with depressions at the portions adjacent the openings therein and portions of the metal of the cylindrical member being displaced and crowded against the cup-shaped member and into said depressions thereby to secure the said members together and prevent relative rotation, and a packing member inserted within said cup-shaped member and retained thereby.

In testimony whereof, I hereunto affix my signature.

ADELBERT E. BRONSON.